(12) United States Patent
Dhanda et al.

(10) Patent No.: US 9,521,572 B2
(45) Date of Patent: Dec. 13, 2016

(54) POWER MONITOR SCHEDULING IN DUAL DATA MODE

(71) Applicant: QUALCOMM Incorporated, San Diego, CA (US)

(72) Inventors: Mungal Dhanda, Slough (GB); Neha Goel, Surrey (GB); Divaydeep Sikri, Surrey (GB)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 14/546,973

(22) Filed: Nov. 18, 2014

(65) Prior Publication Data

US 2016/0095010 A1   Mar. 31, 2016

Related U.S. Application Data (60) Provisional application No. 62/057,169, filed on Sep. 29, 2014.

(51) Int. Cl.
| | |
|---|---|
| *H04L 12/50* | (2006.01) |
| *H04W 24/10* | (2009.01) |
| *H04W 88/06* | (2009.01) |
| *H04W 72/04* | (2009.01) |
| *H04W 76/02* | (2009.01) |

(52) U.S. Cl.
CPC ......... *H04W 24/10* (2013.01); *H04W 72/0446* (2013.01); *H04W 76/021* (2013.01); *H04W 88/06* (2013.01)

(58) Field of Classification Search
USPC ........................................ 370/251, 252, 254
See application file for complete search history.

(56) References Cited

U.S. PATENT DOCUMENTS

| | | | |
|---|---|---|---|
| 7,068,623 B1 | 6/2006 | Barany et al. | |
| 8,238,895 B2 * | 8/2012 | Sorbara ................. | H04L 12/189 370/352 |
| 2007/0265012 A1 | 11/2007 | Sorbara et al. | |
| 2011/0217969 A1 | 9/2011 | Spartz et al. | |
| 2013/0150014 A1 | 6/2013 | Gong et al. | |
| 2014/0064161 A1 | 3/2014 | Sikri et al. | |
| 2014/0106747 A1 | 4/2014 | Josso et al. | |
| 2014/0128082 A1 | 5/2014 | Chirayil | |
| 2014/0199993 A1 | 7/2014 | Dhanda et al. | |

FOREIGN PATENT DOCUMENTS

WO   2011104371 A1   9/2011

OTHER PUBLICATIONS

International Search Report and Written Opinion—PCT/US2015/047666—ISA/EPO—Nov. 10, 2015.

* cited by examiner

*Primary Examiner* — Dang Ton
(74) *Attorney, Agent, or Firm* — Procopio, Cory, Hargreaves & Savitch LLP (57) ABSTRACT

A method for scheduling monitor activity for a mobile communication device includes: receiving less than all of a plurality of bursts for a first subscription; decoding a packet header by decoding the received bursts; determining if a decoded temporary flow identity (TFI) matches a TFI for the mobile communication device; and in response to a mismatch between the decoded TFI and the TFI for the mobile communication device: inhibiting reception of a remaining plurality of bursts; and scheduling the monitor activity in timeslots reserved for the remaining plurality of bursts for the first subscription that do not conflict with transmissions on a second subscription.

27 Claims, 8 Drawing Sheets

POWER MONITOR SCHEDULING IN DUAL DATA MODE

This application claims the benefit of U.S. Provisional Application No. 62/057,169, filed Sep. 29, 2014, the disclosure of which is incorporated herein in its entirety by reference.

BACKGROUND

During normal operation for a dual subscriber identity module (SIM) dual-active (DSDA) mobile communication device, the mobile communication device monitors the signal quality of the cell currently serving a subscription as well as the signal quality of neighboring cells. However, for the DSDA mobile communication device, if monitoring on one subscription is attempted during transmission on another subscription, receiver de-sense may occur on the receive chain of the monitoring subscription due to the proximity of a strong transmission signal on the other subscription.

When two subscriptions are in active data calls there is less opportunity for performing serving cell and neighbor cell monitoring on one subscription without receiver de-sense caused by transmission on the other subscription.

SUMMARY

Apparatuses and methods for power monitor scheduling in a mobile communication device are provided.

According to various embodiments there is provided a method for scheduling monitor activity for a mobile communication device. The method may include: receiving less than all of a plurality of bursts for a first subscription; decoding a packet header by decoding the received bursts; determining if a decoded temporary flow identity (TFI) matches a TFI for the mobile communication device; and in response to a mismatch between the decoded TFI and the TFI for the mobile communication device: inhibiting reception of a remaining plurality of bursts; and scheduling the monitor activity in timeslots reserved for the remaining plurality of bursts for the first subscription that do not conflict with transmissions on a second subscription.

According to various embodiments there is provided a mobile communication device. The mobile communication device may include: a first communication unit; a second communication unit; and a control unit.

The control unit may be configured to: cause the first communication unit to receive less than all of a plurality of bursts on a first subscription; decode a packet header by decoding the received bursts; determine if a decoded temporary flow identity (TFI) matches a TFI for the mobile communication device.

In response to a mismatch between the decoded TFI and the TFI for the mobile communication device the control unit may be configured to: inhibit reception of a remaining plurality of bursts on the first subscription by the first communication unit; and schedule monitor activity for the first subscription on the first communication unit in timeslots reserved for the remaining plurality of bursts that do not conflict with transmissions on a second subscription by the second communication unit.

According to various embodiments there is provided a mobile communication device. The mobile communication device may include: means for receiving less than all of a plurality of bursts for a first subscription; means for decoding a packet header by decoding the received bursts; means for determining if a decoded temporary flow identity (TFI) matches a TFI for the mobile communication device; and in response to a mismatch between the decoded TFI and the TFI for the mobile communication device: means for inhibiting reception of a remaining plurality of bursts; and means for scheduling the monitor activity in timeslots reserved for the remaining plurality of bursts for the first subscription that do not conflict with transmissions on a second subscription.

According to various embodiments there is provided a non-transitory computer readable medium. The non-transitory computer readable medium may have stored thereon instructions for causing one or more processors to perform steps comprising: receiving less than all of a plurality of bursts for a first subscription; decoding a packet header by decoding the received bursts; determining if a decoded temporary flow identity (TFI) matches a TFI for the mobile communication device; and in response to a mismatch between the decoded TFI and the TFI for the mobile communication device: inhibiting reception of a remaining plurality of bursts; and scheduling the monitor activity in timeslots reserved for the remaining plurality of bursts for the first subscription that do not conflict with transmissions on a second subscription.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
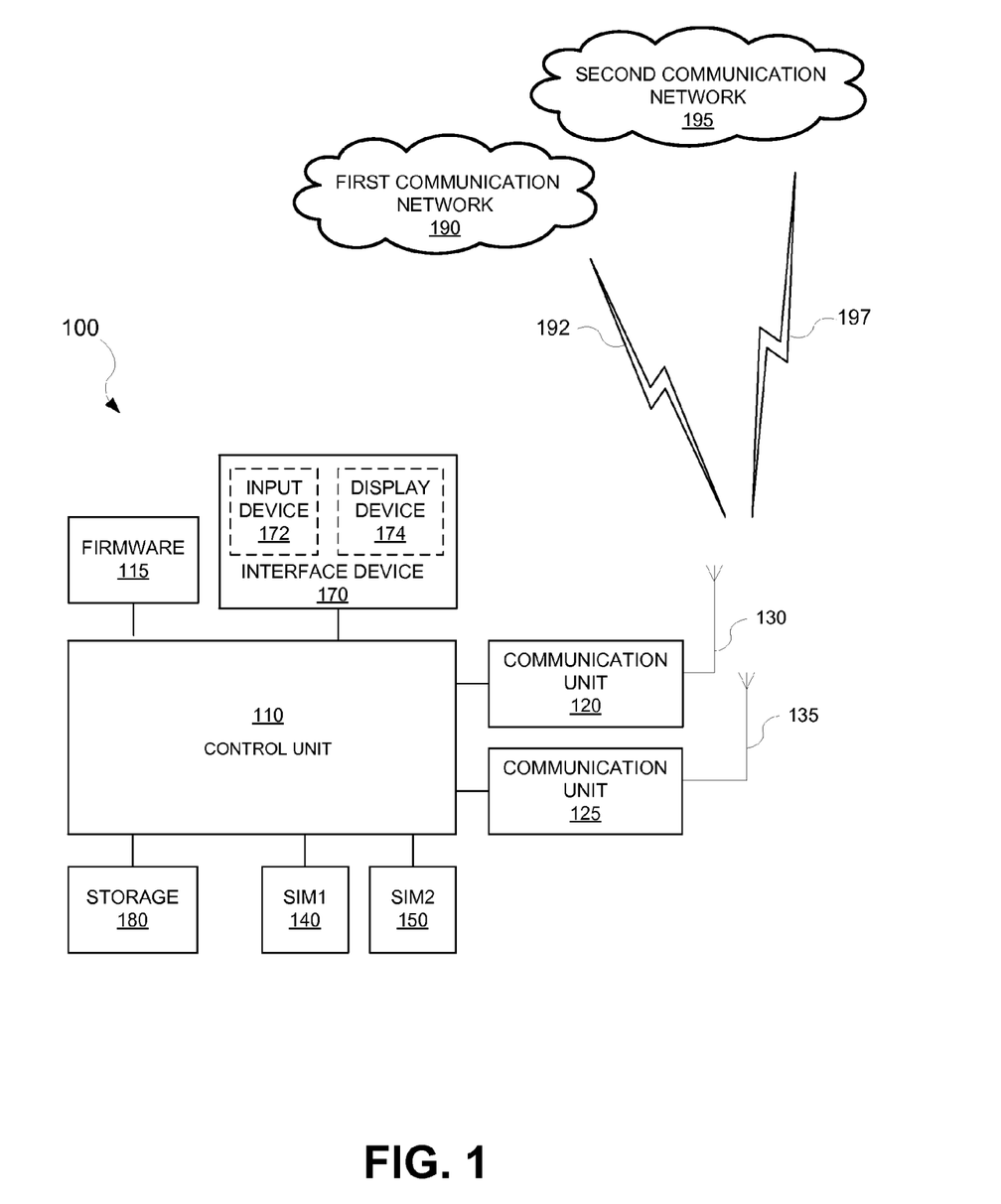
FIG. 1 is a block diagram illustrating a mobile communication device according to various embodiments according to various embodiments.

FIG. 1 is a block diagram illustrating a mobile communication device 100 according to various embodiments. As illustrated in FIG. 1, the mobile communication device 100 may include a control unit 110, a first communication unit 120, a second communication unit 125, a first antenna 130, a second antenna 135, a first SIM 140, a second SIM 150, a user interface device 170, and a storage 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communication units) and may interface with one or more antennas without departing from the scope of the present inventive concept.

The first communication unit 120 may include, for example, but not limited to, a first transceiver (not shown). The second communication unit 125 may include, for example, but not limited to, a second transceiver (not shown). In active mode, a transceiver receives and transmits signals. In idle mode, a transceiver receives but does not transmit signals.

The first SIM 140 may associate the first communication unit 120 with a first subscription (Sub1) 192 on a first communication network 190 and the second SIM 150 may associate the second communication unit 125 with a second subscription (Sub2) 197 on a second communication network 195. In active mode, a communication unit receives and transmits signals. In idle mode, a communication unit receives but does not transmit signals. For convenience, throughout this disclosure Sub1 is associated with the first communication unit 120 and Sub2 is associated with the second communication unit 125. One of ordinary skill in the art will appreciate that either subscription may be associated with either communication unit without departing from the scope of the present inventive concept.

One of ordinary skill in the art will also appreciate that the mobile communication device 100 may include only one communication unit (e.g., the first communication unit 120) and that the first communication unit 120 and the second communication unit 125 may be one communication unit without departing from the scope of the present inventive concept. Further, one of ordinary skill in the art will appreciate that the first SIM 140 and the second SIM 150 may associate Sub1 192 and Sub2 197, respectively, with the one communication unit without departing from the scope of the present inventive concept.

The first communication network 190 and the second communication network 195 may be operated by the same or different service providers, and/or may support the same or different radio access technologies (RATs), for example, but not limited to, Wideband Code Division Multiple Access (WCDMA) and Global System for Mobile communications (GSM).

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the first and second communication units 120, 125, the user interface device 170, and the storage 180. The control unit 110 may be a programmable device, for example, but not limited to, a microprocessor or microcontroller, and may include firmware 115.

The storage 180 may be configured to store application programs necessary for operation of the mobile communication device 100 that are executed by the control unit 110, as well as application data and user data.

During normal operation for a DSDA mobile communication device (e.g., mobile communication device 100), the mobile communication device monitors the signal quality of a cell currently serving each subscription as well as the signal quality of neighboring cells. For general packet radio service (GPRS), each channel may be divided into radio frames of eight timeslots during which a mobile communication device and a base station may communicate. The mobile communication device 100 may use up to six timeslots to receive (RX) and transmit (TX).

Figure 2A:
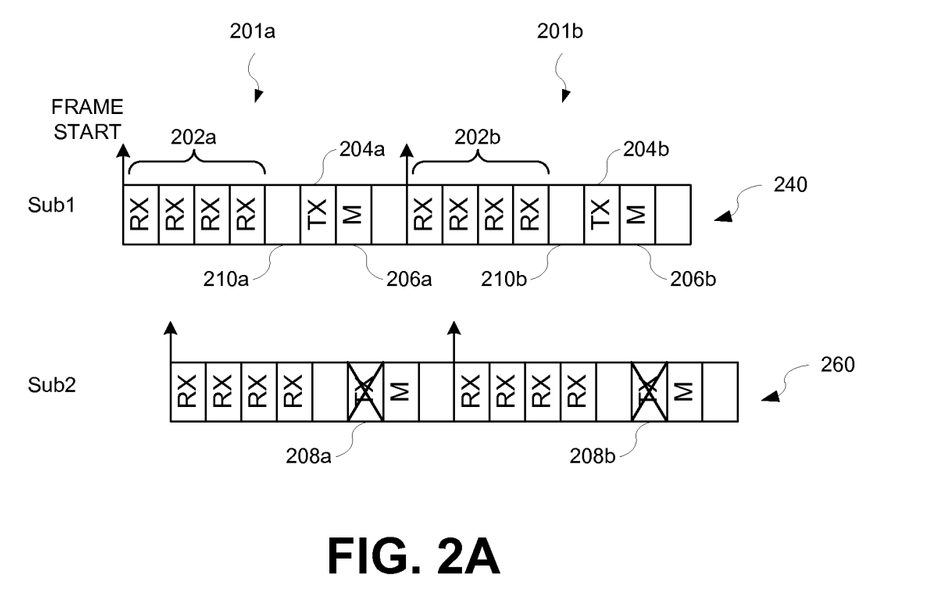
FIG. 2A is a diagram illustrating radio frames for two subscriptions according to various embodiments.

FIG. 2A is a diagram illustrating radio frames for two subscriptions. The radio frames may be, for example, but not limited to, GSM frames, GPRS frames, etc. Referring to FIGS. 1-2A, the eight timeslots in each radio frame 201*a*, 201*b* may include one or more receive (RX) timeslots 202*a*, 202*b* during which the mobile communication device 100 receives data and instructions from a base station, one or more transmit (TX) timeslots 204*a*, 204*b* during which the mobile communication device 100 transmits data and instructions to the base station, and one or more monitor (M) timeslots 206*a*, 206*b* during which the mobile communication device 100 monitors the signal level of the neighboring cells and optionally monitors the signal level of the serving cell.

If any portion of a monitor timeslot 206*a*, 206*b* for a first subscription (e.g., Sub1 192) on one channel 240 occurs during any portion of a transmission timeslot 208*a*, 208*b* for a second subscription (e.g., Sub2 197) on another channel 260, receiver de-sense may cause erroneous monitor results on Sub1 192.

According to various embodiments, the control unit 110 for the mobile communication device 100 may be configured to reschedule monitor activity on one subscription to a position within a radio frame that does not conflict with a transmission time on the other subscription. For example, monitor activity for one subscription may be scheduled when a voice call on another subscription is in discontinuous transmission (DTX) mode (i.e., the call is active but a party is not speaking so no data is available to transmit). Also, non-allocated TX timeslots or non-used RX timeslots resulting from early packet header decode on a subscription may be used to reschedule the monitor activity on that subscription.

Early packet header decode provides information of the channel codecs, uplink state flag (USF) and temporary flow identity (TFI). Early header decode is possible because the header is coded at a ⅓ code rate and the first two bursts contain nearly 98% of the header information. This allows savings in decoding GPRS and enhanced GPRS (EGPRS) header blocks during packet data transfer.

If a TFI mismatch occurs (i.e., data is not intended for the mobile communication device 100 by which it is received) the remaining bursts of the header block may be discarded since they do not need to be decoded. Further, when the TFI matches the TFI for the mobile communication device 100, under good channel conditions certain channel codecs can be decoded in fewer than four received bursts. If the mobile communication device 100 does not need to receive all four bursts corresponding to one radio block, the mobile communication device 100 may switch off the receiver for the remaining bursts of the radio block. Monitors for neighbor cells may then be scheduled in these unutilized timeslots. These vacant positions can then be used to perform neighbor cell monitoring.

Figure 2B:
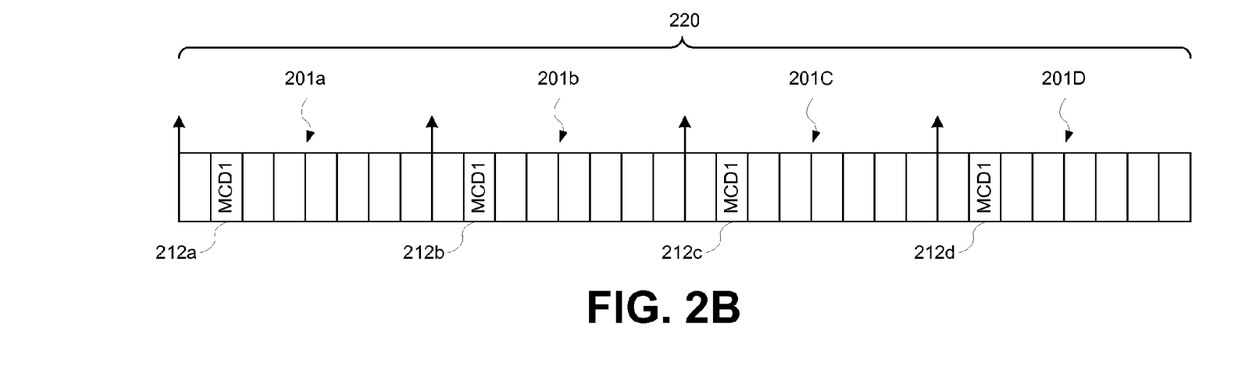
FIG. 2B is a diagram illustrating an example of a downlink radio block having four radio frames with timeslot 1 assigned in each of the radio frames for a mobile communication device to receive bursts.

FIG. 2B is a diagram illustrating an example of a downlink radio block 220 having four radio frames 201*a*-201*d* with timeslot 1 212*a*-212*d* assigned in each of the radio frames 201*a*-201*d* for the mobile communication device 100 (e.g., FIG. 1) to receive bursts. The radio frames may be, for example, but not limited to, GSM frames, GPRS frames, etc. Referring to FIGS. 1-2B, after receiving the first two bursts in timeslot 1 212*a*, 212*b* of the first two radio frames 201*a*, 201*b*, the mobile communication device 100 may be able to decode the header and determine that the radio block 220 is not intended for the mobile communication device 100; therefore, the remaining two bursts need not be received.

Monitors may be scheduled in the unutilized timeslots (i.e., timeslot 1 212c, 212d) of the last two radio frames 201c, 201d of the radio block 220 to perform measurements on neighbor cells.

Figure 2C:
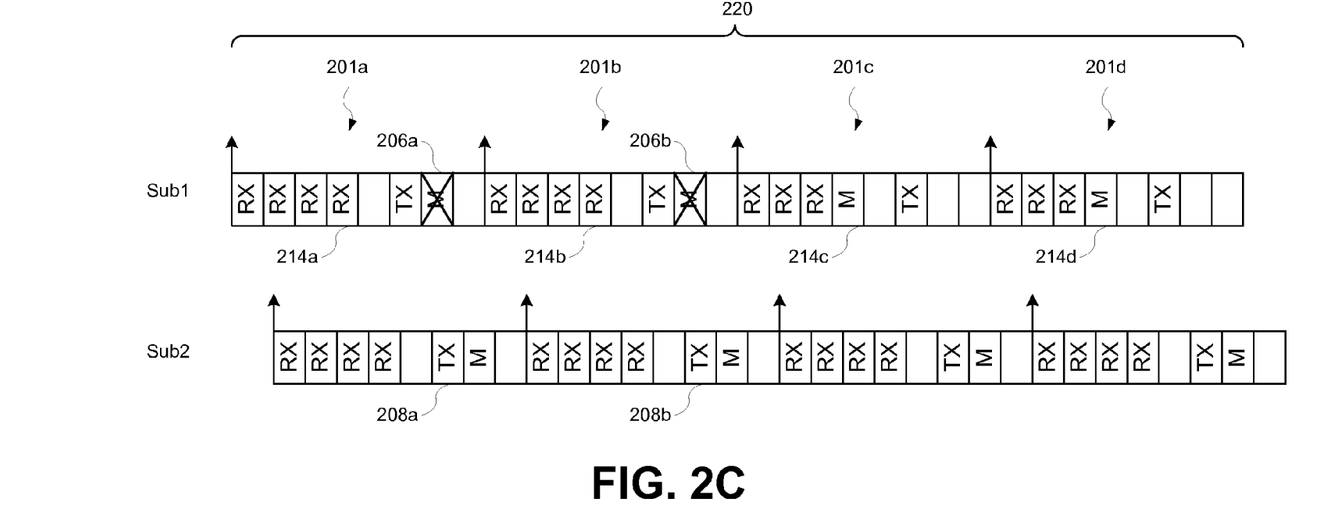
FIG. 2C is a diagram illustrating an example of rescheduling monitors to unutilized timeslots in a radio block resulting from early header decode.

FIG. 2C is a diagram illustrating an example of rescheduling monitors to unutilized timeslots in a radio block resulting from early header decode. Referring to FIGS. 1-2C, transmissions 208a, 208b on Sub2 197 may interfere (i.e., cause receiver desense) with monitors 206a, 206b on Sub1 192. Therefore, the monitor activity for the monitors 206a, 206b cannot be performed during the transmissions 208a, 208b on Sub2 197.

The control unit 110 may cause the mobile communication device 100 to perform an early header decode on the fourth downlink timeslots 214a, 214b in the first and second radio frames 201a, 201b for Sub1 192. The control unit 110 may determine that the downlink radio block 220 is intended for another mobile communication device, and therefore the bursts in the fourth timeslots 214c, 214d for the third and fourth radio frames 201c, 201d for the radio block 220 need not be received. Accordingly, the control unit 110 may reschedule monitors in the fourth timeslots 214c, 214d for the third and fourth radio frames 201c, 201d for Sub1 192 that do not conflict with transmissions on Sub2 197, thereby avoiding the need to cancel the transmissions on Sub2 197. One of ordinary skill in the art will appreciate that the above-described rescheduling mechanism may be applied to other timeslots in a radio frame/radio block without departing from the scope of the present inventive concept.

In addition, uplink data transfers may require the network (e.g., the first communication network 190 and/or the second communication network 195) to assign timeslots that a mobile communication device (e.g., mobile communication device 100) may use for uplink data transfer and give permission to the mobile communication device to transmit on the uplink. Assigning timeslots for uplink data transfer may be done via assignment messages. Permitting the mobile communication device 100 to transmit on one or more of the assigned timeslots is done using the USF in every downlink header block. A USF is a 3-bit value given to any mobile communication device 100 assigned an uplink timeslot by the network. When the mobile communication device 100 finds the same USF value in the downlink header of a radio block in the assigned timeslot then mobile communication device 100 may transmit in the subsequent radio block in that timeslot. This scheme is called dynamic allocation. At least two variations on dynamic allocation may be used: extended dynamic allocation (EDA) and USF granularity.

With EDA, when a mobile communication device (e.g., mobile communication device 100) detects its assigned USF on one assigned uplink timeslot, the mobile communication device may transmit on that timeslot as well as all other higher numbered timeslots assigned to the mobile communication device for uplink timeslots.

USF granularity depends on the granularity of the radio blocks (i.e., one radio block or four radio blocks). Upon detecting its assigned USF, a mobile communication device (e.g., mobile communication device 100) may transmit on one radio block or four radio blocks.

If a mobile communication device does not find its assigned USF on a timeslot, then the mobile communication device may not transmit on that time slot. If EDA is used, the mobile communication device also may not transmit on all other higher numbered timeslots. The lack of permission to transmit creates unutilized timeslots in the radio frames were monitors may be rescheduled.

Figure 2D:
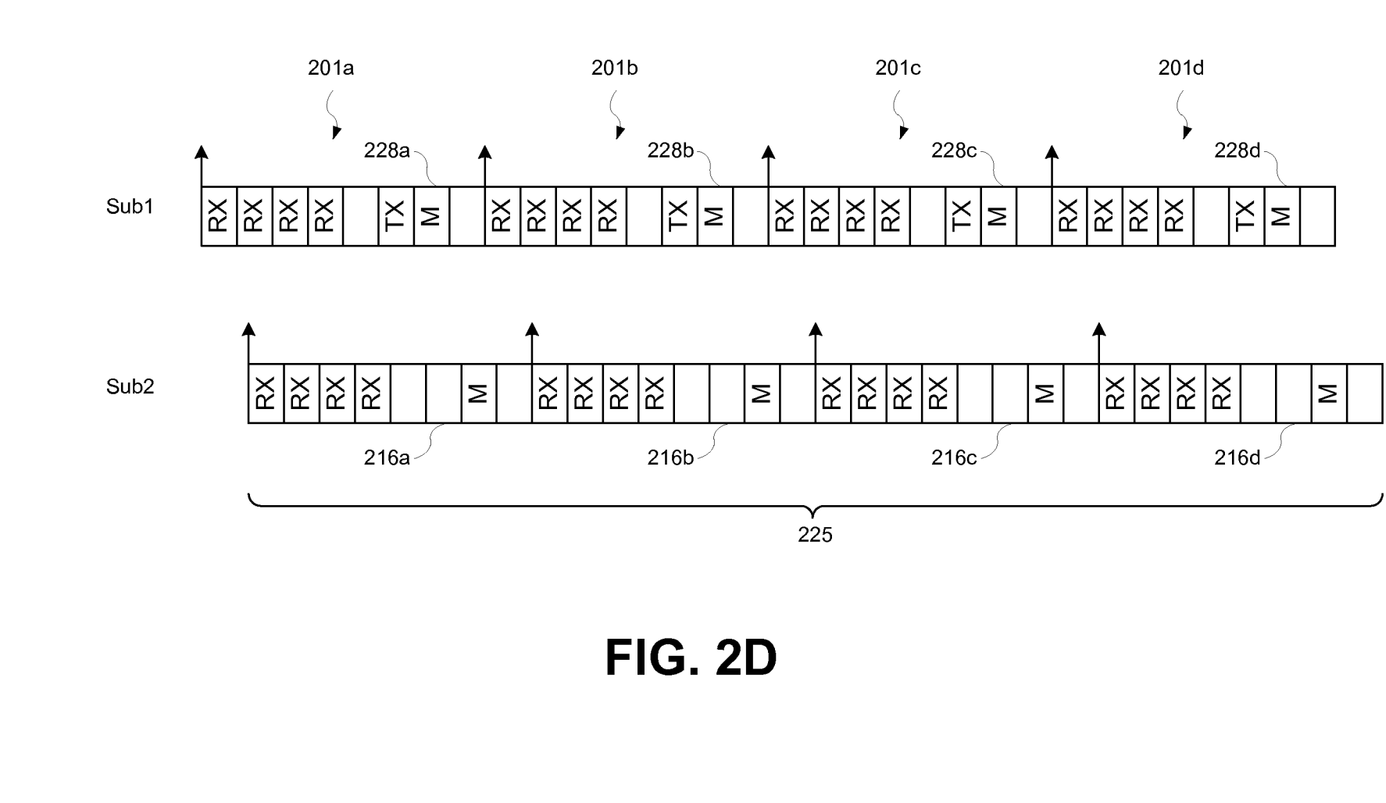
FIG. 2D is a diagram illustrating an example of scheduling monitors based on unutilized timeslots in a radio block when an assigned USF is not provided.

FIG. 2D is a diagram illustrating an example of scheduling monitors based on unutilized timeslots in a radio block when an assigned USF is not provided. Referring to FIGS. 1-2D, if the control unit 110 does not detect the assigned USF for Sub2 197 in the previous radio block (not shown), Sub2 197 will not have permission to transmit in the assigned uplink timeslots 216a-216d for the radio frames 218a-218d in the next radio block 225 (or four radio blocks if EDA is used). The control unit 110 may schedule monitors for Sub1 192 in timeslots 228a-228d that would otherwise have conflicted with transmission on Sub2 197. Thus, early header decoding, no USF allocation, or a combination thereof creates unutilized timeslots in a radio block to which monitors may be scheduled with causing cancelation of receive or transmit activity.

According to various embodiments, monitor activity may be performed based on a relative priority scheme. Monitor activity scheduled to take place during a high priority activity on a first subscription (e.g., Sub1 192) may conflict with a transmission for a low priority activity on a second subscription (e.g., Sub2 197). An attempt may be made to reschedule the monitor activity to take place in a position within a radio frame that does not conflict with the low priority activity transmission. Under a relative priority scheme, if the monitor activity cannot be rescheduled transmission for the low priority activity on the second subscription may be inhibited to allow the monitor activity to take place during the high priority activity on the first subscription.

When a monitor timeslot 206a, 206b for one subscription conflicts with a transmission timeslot 208a, 208b for another subscription, the transmission may be inhibited during the transmission timeslot 208a, 208b based on relative priorities of the activities on the subscriptions. Priorities for the various activities on the different subscriptions may be assigned priorities by the control unit 110. The priority for performing monitor activities based on different subscription connection combinations is shown in Table 1 below.

TABLE 1

Priority for Power Monitor Scheduling in Dual Data Mode

|  |  | Subscription 1 | | | | | |
|---|---|---|---|---|---|---|---|
|  |  | Voice Active | Voice Hold | DTM Active | DTM Hold | Data High | Data BG |
| Subscription 2 | Voice Active | N/A | Legacy | N/A | Active call monitors take priority[1] Held call monitors are low priority[2,3] | Active call monitors take priority[1] Data call monitors are low priority[2,3] | Active call monitors take priority[1] Data call monitors are low priority[2,3] |
|  | Voice Hold | Legacy | N/A | Active call monitors take priority[1] | N/A | Held call monitors take priority[1] | Held call monitors take priority[1] |

TABLE 1-continued

Priority for Power Monitor Scheduling in Dual Data Mode

| | | Subscription 1 | | | | |
|---|---|---|---|---|---|---|
| | Voice Active | Voice Hold | DTM Active | DTM Hold | Data High | Data BG |
| DTM Active | N/A | Legacy | Held call monitors are low priority[2,3] N/A | Active call monitors take priority[1] Held call monitors are low priority[2,3] | Data call monitors are low priority[2,3] Active call monitors take priority[1] Data call monitors are low priority[2,3] | Data call monitors are low priority[2,3] Active call monitors take priority[1] Data call monitors are low priority[2,3] |
| DTM Hold | Active call monitors take priority[1] Held call monitors are low priority[2] | NA | Active call monitors take priority[1] Held call monitors are low priority[2,3] | N/A | Held call monitors take priority[1] Data call monitors are low priority[2,3] | Held call monitors take priority[1] Data call monitors are low priority[2,3] |
| Data High | Active call monitors take priority[1] Data call monitors are low priority[2,3] | Held call monitors take priority[1] Data BG call monitors are low priority[2,3] | Active call monitors take priority[1] Data call monitors are low priority[2,3] | Held call monitors take priority[1] Data BG call monitors are low priority[2,3] | N/A | Data high call monitors take priority[1] Data BG call monitors are low priority[2,3] |
| Data BG | Active call monitors take priority[1] Data BG call monitors are low priority[2,3] | Held call monitors take priority[1] Data BG call monitors are low priority[2,3] | Active call monitors take priority[1] Data BG call monitors are low priority[2,3] | Held call monitors take priority[1] Data BG call monitors are low priority[2,3] | Data high call monitors take priority[1] Data BG call monitors are low priority[2,3] | N/A |

Note
[1] Unless held call is transmitting on the fast associated control channel (FACCH), slow associated control channel (SACCH), standalone dedicated control channel (SDCCH); or data background (BG) call is transmitting on packet associated control channel (PACCH), or relative reserved block period (RRBP).
Note
[2] Dual transfer mode (DTM) on active call will allow some monitors for held call to get through.
Note
[3] The control unit can also utilize non-allocated TX timeslots or non-used RX timeslots resulting from, for example, early header decode on the same subscription.

As indicated in Table 1, monitor activity during an active voice call on one subscription may take priority over transmission on a data call on another subscription unless the data call is transmitting on one of PACCH and RRBP. Monitor activity during an active voice call may also take priority over transmission on a held call on another subscription, unless the held call is transmitting on one of the FACCH, SACCH, and SDCCH. Also, monitor activity during a held voice call on one subscription may take priority over transmission on a data call on another subscription. Monitor activity during a high priority data call, for example, but not limited to, a multi-media service (MMS) data call, on one subscription may take priority over transmission on a background (BG) data call on another subscription.

Further, dual transfer mode (DTM) enables simultaneous transfer of voice and data over the same radio channel. For a simultaneous voice and data call, a data call might start on an ongoing voice call or a voice call might start on an ongoing data call. Therefore, monitor during an active DTM call on one subscription may take priority over transmission on a held voice call on another subscription, except as indicated above.

In each case indicated in Table 1, the control unit 110 may be configured to reschedule monitor activity during the low priority activity on one subscription to a timeslot that does not conflict with a TX time on the other subscription. If an appropriate timeslot (i.e., a timeslot that does not conflict with a TX time for the high priority activity) cannot be scheduled within the current radio frame for monitor activity during the low priority activity, the control unit 110 may be configured to schedule the monitor activity during the low priority activity in a subsequent radio frame.

In various embodiments, the control unit 110 may reduce the monitor rate. By reducing the monitor rate, three measurements on one GSM frequency spread evenly over 480 ms are performed. For example, with 32 GSM neighbor cells, the mobile communication device 100 needs to make 32 cells×3 measurements each=96 separate measurements over 480 ms. With 16 GSM neighbor cells the mobile communication device 100 needs to make only 48 separate measurements over 480 ms. That is, fewer GSM neighbor cells mean fewer monitors that need to be performed over 480 ms.

Figure 3A:
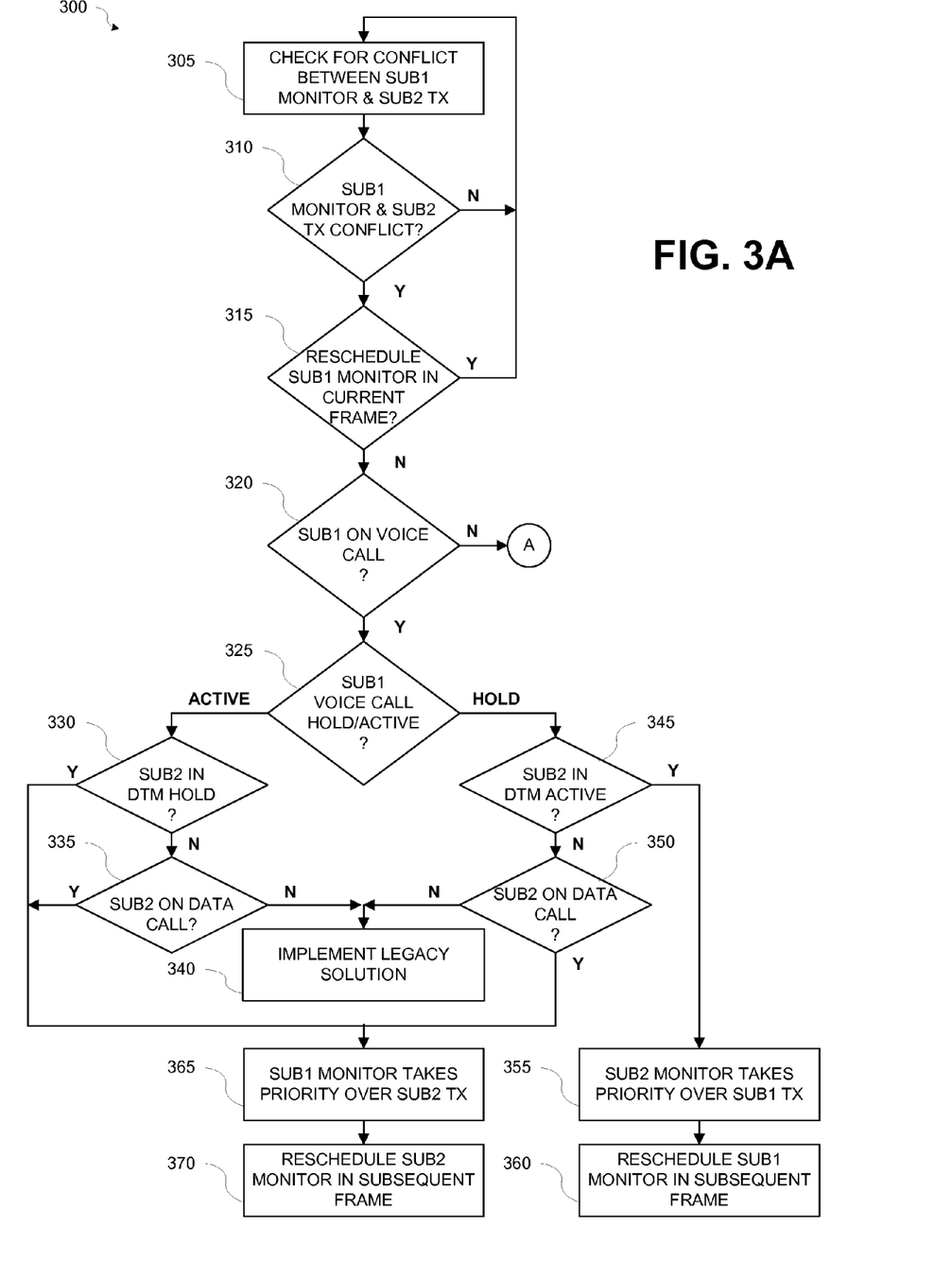
FIGS. 3A, 3B, and 3C are flowcharts illustrating a method according to various embodiments.

FIGS. 3A, 3B, and 3C are flowcharts illustrating a method according to various embodiments. Referring to FIGS. 1-3A, the control unit 110 may check for a conflict between a timeslot for monitor activity 230 for a first subscription (e.g., Sub1 192) and a TX timeslot 250 for a second subscription (e.g., Sub2 197) (305). If the control unit 110 determines that no conflict exists (310-N), the control unit 110 may continue to check for conflicts (305).

If the control unit 110 determines that a conflict exists (310-Y), the control unit 110 may attempt to reschedule the monitor activity for Sub1 192 to a non-conflicting timeslot in a current radio frame (315). For example, monitor activity for Sub1 192 may be scheduled when a voice call on Sub1 197 is in discontinuous transmission (DTX) mode. Also, non-allocated TX timeslots or non-used RX timeslots resulting from early header decode on Sub1 192 may be used to reschedule the monitor activity on Sub1 192. If the control unit 110 is able to reschedule the monitor activity for Sub1 192 (315-Y), the control unit 110 may continue to check for conflicts (305). If the monitor activity for Sub1 192 cannot be rescheduled to a non-conflicting timeslot in a current radio frame (315-N), the control unit 110 may determine whether an activity on Sub1 192 or an activity on Sub2 197 has a higher priority.

The control unit 110 may determine if the activity on Sub1 192 is a voice call (320). If the activity on Sub1 192 is a voice call (320-Y), the control unit 110 may determine if the voice call is active or on hold (325).

If the Sub1 192 voice call is active (325-ACTIVE), the control unit 110 may determine if Sub2 197 is operating in DTM hold (330). If Sub2 197 is not operating in DTM hold (330-N), the control unit 110 may determine if Sub2 197 is on a data call (335). If Sub2 197 is not on a data call (335-N), the control unit 110 may implement a legacy solution to resolve the conflict (340).

If the control unit 110 determines that Sub2 197 is operating in DTM hold (330-Y) or Sub2 197 is on a data call (335-Y), the control unit 110 may cause the monitor activity on Sub1 192 to take priority over the Sub2 197 TX, and the Sub1 192 monitor activity may be performed in the conflicting timeslot (365). Further, the control unit 110 may reschedule the Sub2 197 monitor activity that conflicts with the Sub1 192 TX activity to timeslots in subsequent radio frames (370). For example, monitor activity for Sub2 197 may be scheduled when a voice call on Sub1 192 is in discontinuous transmission (DTX) mode. Also, non-allocated TX timeslots or non-used RX timeslots resulting from early header decode on Sub2 197 may be used to reschedule the monitor activity on Sub2 197.

If the control unit 110 determines at operation 325 that the Sub1 192 voice call is on hold (325-HOLD), the control unit 110 may determine if Sub2 197 is operating in DTM active (345). If Sub2 197 is not operating in DTM active (345-N), the control unit 110 may determine if Sub2 197 is on a data call (350). If Sub2 197 is not on a data call (350-N), the control unit 110 may implement a legacy solution to resolve the conflict (340). If Sub2 197 is on a data call (350-Y), the control unit 110 may cause the monitor activity on Sub1 192 to take priority over the Sub2 197 TX, and the Sub1 192 monitor activity may be performed in the conflicting timeslot (365).

Further, the control unit 110 may reschedule the Sub2 197 monitor activity that conflicts with the Sub1 192 TX activity to timeslots in subsequent radio frames (370). For example, monitor activity for Sub2 197 may be scheduled when a voice call on Sub1 192 is in discontinuous transmission (DTX) mode. Also, non-allocated TX timeslots or non-used RX timeslots resulting from early header decode on Sub2 197 may be used to reschedule the monitor activity on Sub2 197.

If the control unit 110 determines at operation 345 that Sub2 197 is operating in DTM active (345-Y), the control unit 110 may cause the monitor activity on Sub2 197 to take priority over the Sub1 192 TX and the Sub2 197 monitor activity may be performed in the conflicting timeslot (355) while the Sub1 192 TX may be canceled. Further, the control unit 110 may reschedule the Sub1 192 monitor activity that conflicts with the Sub2 197 TX activity to timeslots in subsequent radio frames (360). For example, monitor activity for Sub1 192 may be scheduled when a voice call on Sub2 197 is in discontinuous transmission (DTX) mode. Also, non-allocated TX timeslots or non-used RX timeslots resulting from early header decode on Sub1 192 may be used to reschedule the monitor activity on Sub1 192.

Figure 3B:
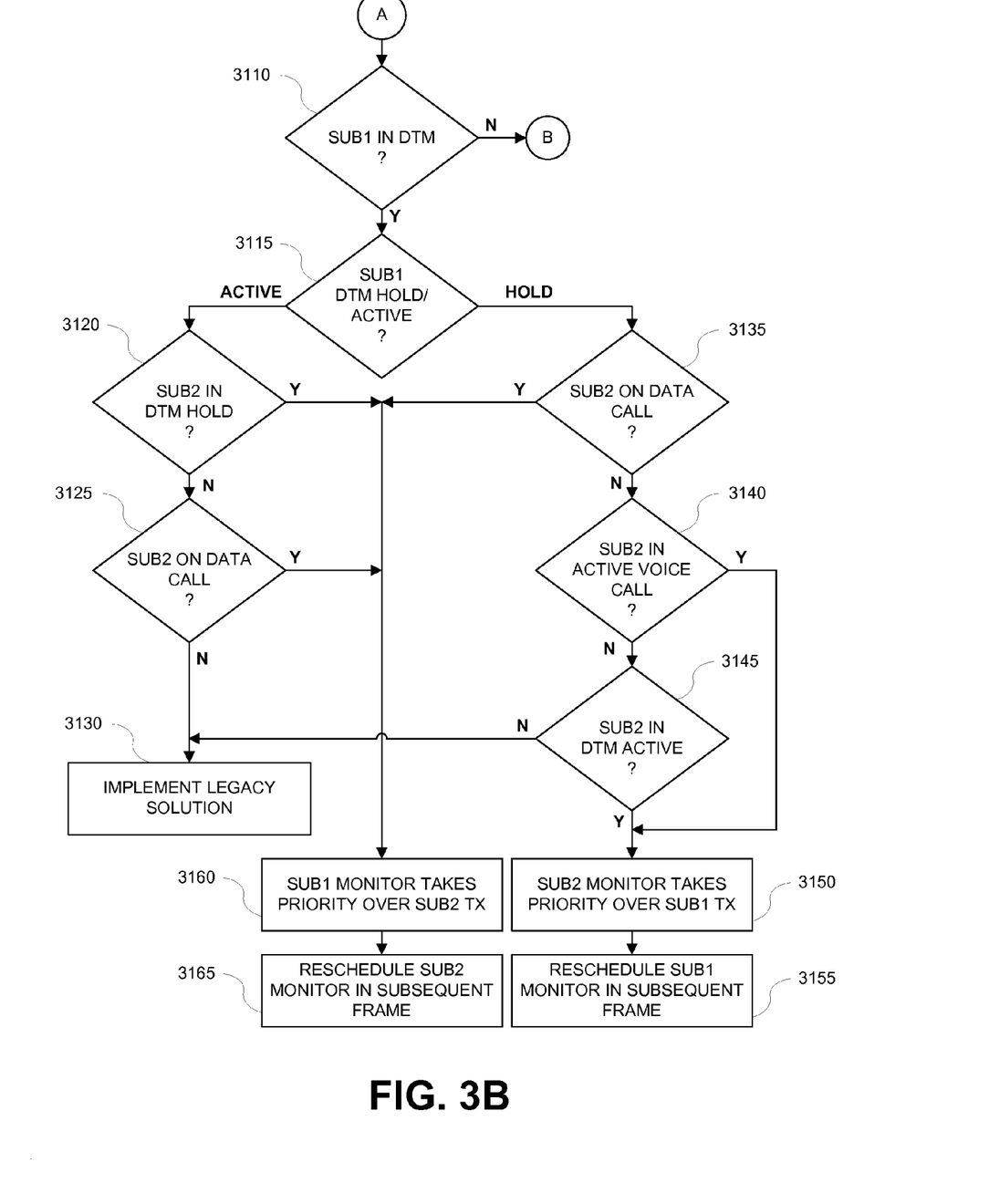

If the control unit 110 determines at operation 320 that the activity on Sub1 192 is not a voice call (320-N), the process may continue at operation 3110 (FIG. 3B).

Referring to FIGS. 1-3B, the control unit 110 may determine if Sub1 192 is operating in DTM (3110). If Sub1 192 is operating in DTM (3110-Y), the control unit 110 may determine if DTM is active or on hold (3115).

If Sub1 192 is operating in DTM active (3115-ACTIVE), the control unit 110 may determine if Sub2 197 is operating in DTM hold (3120). If Sub2 197 is not operating in DTM hold (3120-N), the control unit 110 may determine if Sub2 197 is on a data call (3125). If Sub2 197 is not on a data call (3125-N), the control unit 110 may implement a legacy solution to resolve the conflict (3130).

If the control unit 110 determines that Sub2 197 is operating in DTM hold (3120-Y) or Sub2 197 is on a data call (3125-Y), the control unit 110 may cause the monitor activity on Sub1 192 to take priority over the Sub2 197 TX and the Sub1 192 monitor activity may be performed in the conflicting timeslot (3160) while the Sub2 197 TX may be canceled. Further, the control unit 110 may reschedule the Sub2 197 monitor activity that conflicts with the Sub1 192 TX activity to timeslots in subsequent radio frames (3165). For example, monitor activity for Sub2 197 may be scheduled when a voice call on Sub1 192 is in discontinuous transmission (DTX) mode. Also, non-allocated TX timeslots or non-used RX timeslots resulting from early header decode on Sub2 197 may be used to reschedule the monitor activity on that subscription.

If the control unit 110 determines at operation 3115 that Sub1 192 is operating on DTM hold (3115-HOLD), the control unit 110 may determine Sub2 197 is on a data call (3135). If Sub2 197 is on a data call (3135-Y), the control unit 110 may cause the monitor activity on Sub1 192 to take priority over the Sub2 197 TX and the Sub1 192 monitor activity may be performed in the conflicting timeslot (3160) while the Sub2 197 TX may be canceled. Further, the control unit 110 may reschedule the Sub2 197 monitor activity that conflicts with the Sub1 192 TX activity to timeslots in subsequent radio frames (3165). For example, monitor activity for Sub2 197 may be scheduled when a voice call on Sub1 192 is in discontinuous transmission (DTX) mode. Also, non-allocated TX timeslots or non-used RX timeslots resulting from early header decode on Sub2 197 may be used to reschedule the monitor activity on Sub2 197.

If the control unit 110 determines that Sub2 197 is not on a data call (3135-N), the control unit 110 may determine if Sub2 197 is in an active voice call (3140). If Sub2 197 is not in an active voice call (3140-N), the control unit 110 may determine if Sub2 197 is operating in DTM active (3145). If Sub2 197 is not operating in DTM active (3145-N), the control unit 110 may implement a legacy solution to resolve the conflict (3130).

If the control unit 110 determines that Sub2 197 is on an active voice call (3140-Y) or Sub2 197 is operating in DTM active (3145-Y), the control unit 110 may cause the monitor activity on Sub2 197 to take priority over the Sub1 192 TX and the Sub2 197 monitor activity may be performed in the conflicting timeslot (3150) while the Sub1 192 TX may be canceled. Further, the control unit 110 may reschedule the Sub1 192 monitor activity that conflicts with the Sub2 197 TX activity to timeslots in subsequent radio frames (3155). For example, monitor activity for Sub1 192 may be scheduled when a voice call on Sub2 197 is in discontinuous transmission (DTX) mode. Also, non-allocated TX timeslots or non-used RX timeslots resulting from early header decode on Sub1 192 may be used to reschedule the monitor activity on Sub1 192.

Figure 3C:
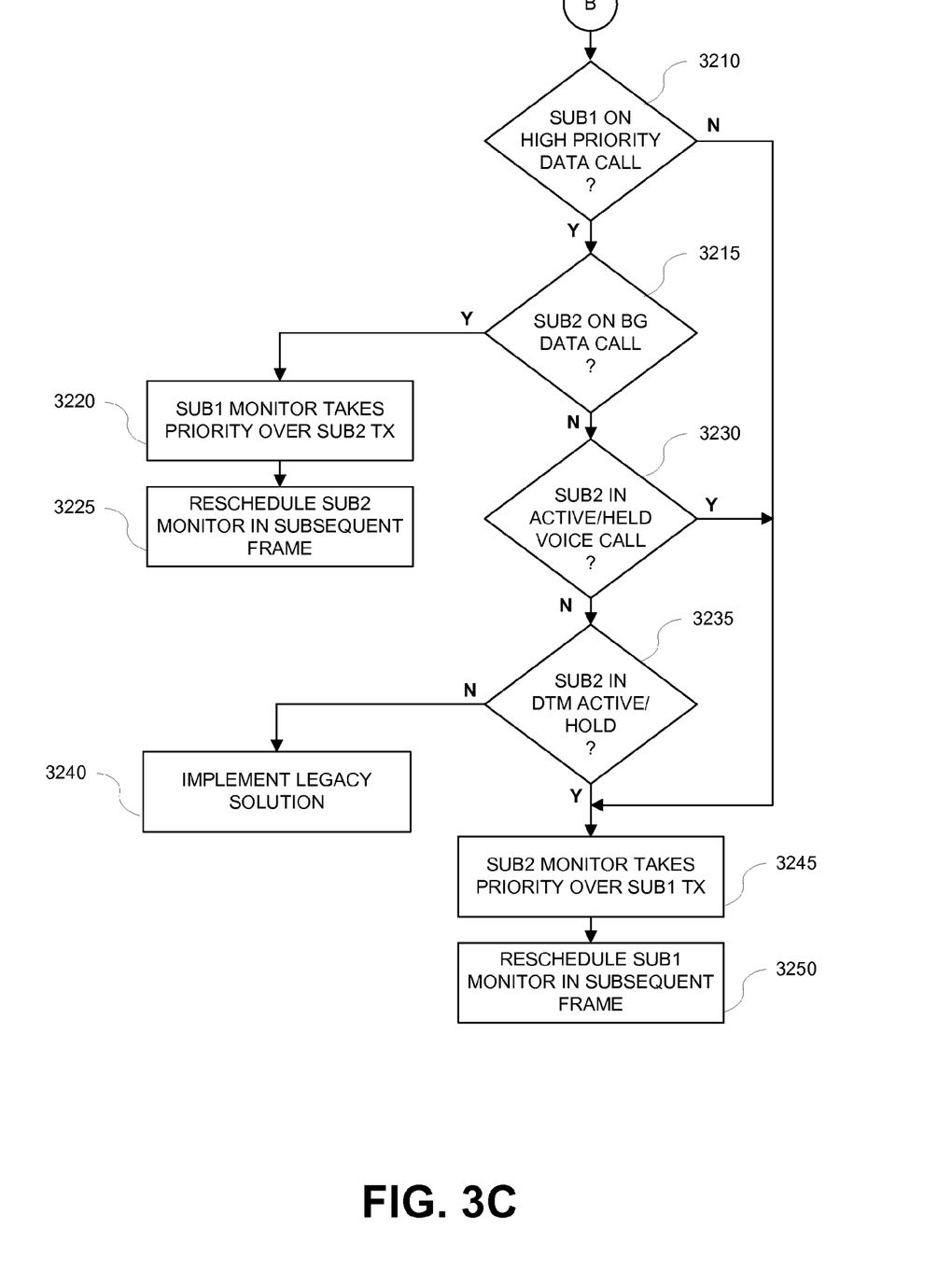

If the control unit 110 determines at operation 3110 that Sub1 192 is not operating in DTM (3110-N), the process may continue at operation 3210 (FIG. 3C).

Referring to FIGS. 1-3C, the control unit 110 may determine if Sub1 192 is on a high priority data call (3210). If Sub1 192 is not on a high priority data call (3210-N), the control unit 110 may cause the monitor activity on Sub2 197 to take priority over the Sub1 192 TX and the Sub2 197 monitor activity may be performed in the conflicting timeslot (3245) while the Sub1 192 TX may be canceled.

Further, the control unit 110 may reschedule the Sub1 192 monitor activity that conflicts with the Sub2 197 TX activity to timeslots in subsequent radio frames (3250). For example, monitor activity for Sub1 192 may be scheduled when a voice call on Sub1 197 is in discontinuous transmission (DTX) mode. Also, non-allocated TX timeslots or non-used RX timeslots resulting from early header decode on Sub1 192 may be used to reschedule the monitor activity on Sub1 192.

If the control unit 110 determines that Sub1 192 is on a high priority data call (3210-Y), the control unit 110 may determine if Sub2 197 is on a background data call (3215). If Sub2 197 is on a background data call (3215-Y), the control unit 110 may cause the monitor activity on Sub1 192 to take priority over the Sub2 197 TX and the Sub1 192 monitor activity may be performed in the conflicting timeslot (3220) while the Sub2 197 TX may be canceled. Further, the control unit 110 may reschedule the Sub2 197 monitor activity that conflicts with the Sub1 192 TX activity to timeslots in subsequent radio frames (3225). For example, monitor activity for Sub2 197 may be scheduled when a voice call on Sub1 192 is in discontinuous transmission (DTX) mode. Also, non-allocated TX timeslots or non-used RX timeslots resulting from early header decode on Sub2 197 may be used to reschedule the monitor activity on Sub2 197.

If the control unit 110 determines that Sub2 197 is not on a background data call (3215-N), the control unit 110 may determine if Sub2 197 is on an active or held voice call (3230). If Sub2 197 is not on an active or held voice call (3230-N), the control unit 110 may determine if Sub2 197 is operating in DTM active or hold (3235). If Sub2 197 is not operating in DTM active or hold (3235-N), the control unit 110 may implement a legacy solution to resolve the conflict (3240).

If the control unit 110 determines that Sub2 197 is on an active or held voice call (3230-Y) or that Sub2 197 is operating in DTM active or hold (3235-Y), the control unit 110 may cause the monitor activity on Sub2 197 to take priority over Sub1 192 TX, and the Sub2 197 monitor activity may be performed in the conflicting timeslot (3245) while the Sub1 192 TX may be canceled. Further, the control unit 110 may reschedule the Sub1 192 monitor activity that conflicts with the Sub2 197 TX activity to timeslots in subsequent radio frames (3250). For example, monitor activity for Sub1 192 may be scheduled when a voice call on Sub1 197 is in discontinuous transmission (DTX) mode. Also, non-allocated TX timeslots or non-used RX timeslots resulting from early header decode on Sub1 192 may be used to reschedule the monitor activity on Sub1 192.

Figure 4:
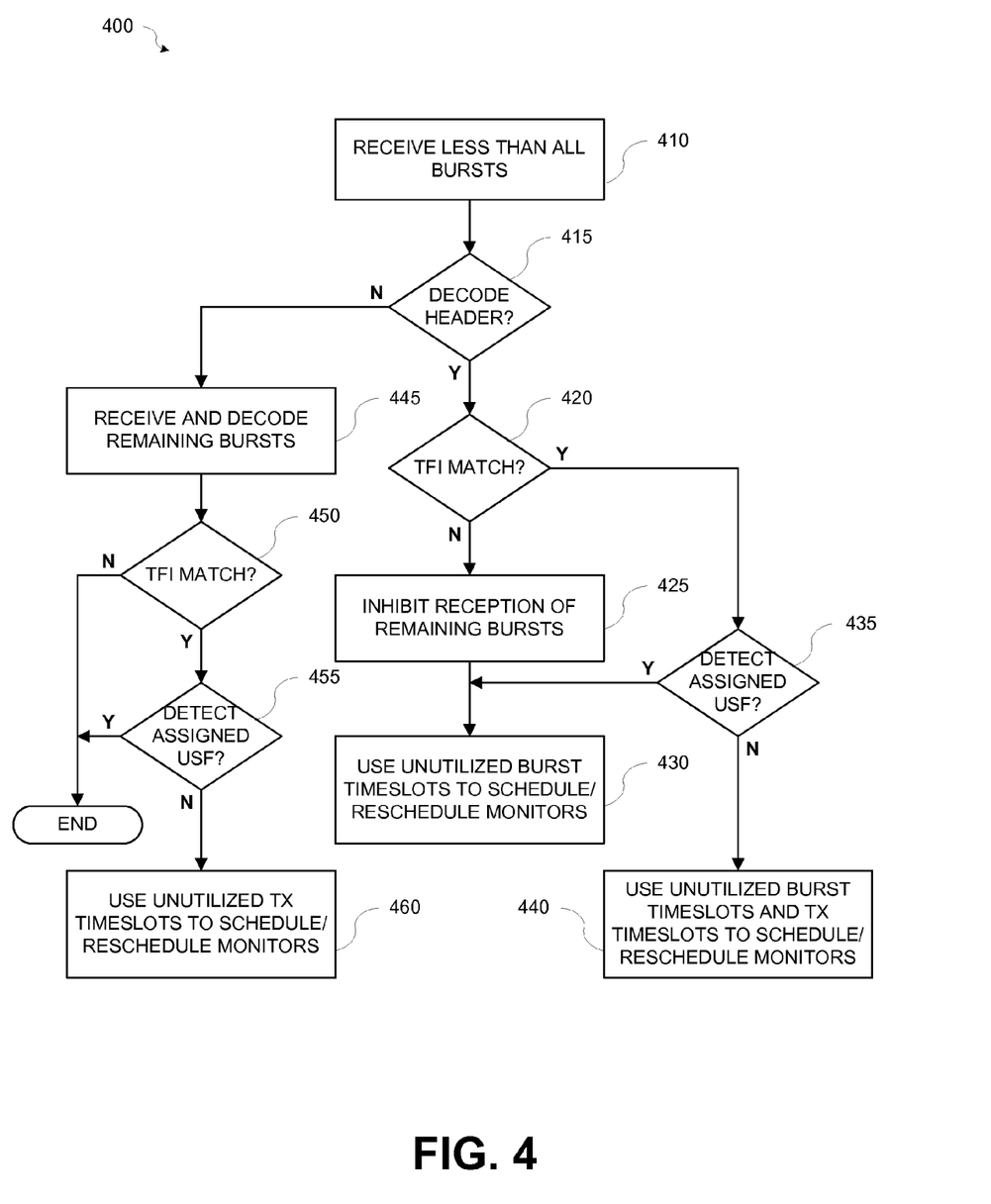
FIG. 4 is a flowchart illustrating a method for scheduling monitors according to various embodiments

FIG. 4 is a flowchart illustrating a method 400 for scheduling monitors according to various embodiments. Referring to FIGS. 1-4, the control unit 110 may cause the mobile communication device 100 to receive less than all of a plurality of bursts on a first subscription (e.g., Sub1 192) (410). For example, a communication network (e.g., the first communication network 190) may transmit four bursts and the mobile communication device 100 may receive less than four of the bursts.

If the header is decoded using the received bursts (415-Y), the control unit 110 may determine if the decoded TFI in the header matches the TFI for the mobile communication device 100 (420). If the decoded TFI does not match the TFI for the mobile communication device 100 (420-N), the control unit 110 may inhibit reception of the remaining plurality of bursts (425). The control unit 110 may utilize the timeslots for the remaining plurality of bursts that are not received to schedule/reschedule monitor activity for Sub1 192 where the timeslots do not conflict with transmissions on a second subscription (e.g., Sub2 197) (430).

If the decoded TFI matches the TFI for the mobile communication device 100 (420-Y), the control unit 110 may determine if a USF is detected in the decoded header in a timeslot assigned to the mobile communication device 100 (435). If the USF is detected (435-Y), the mobile communication device 100 is permitted to transmit in the assigned timeslot based on a dynamic allocation scheme. Therefore, the control unit 110 may not use those assigned transmit timeslots. The control unit 110 may use the timeslots for the remaining plurality of bursts that are not received to schedule/reschedule monitor activity for Sub1 192 where the timeslots do not conflict with transmissions on a second subscription (e.g., Sub2 197) (430).

If the USF is not detected (435-N), Sub1 192 is not permitted to perform uplink TX in specified timeslots of subsequent blocks. The control unit 110 may use the timeslots for the remaining plurality of bursts that are not received as well as the unutilized TX timeslots to schedule/reschedule monitors on Sub1 192 based on the dynamic allocation scheme (440). If EDA is used, the control unit 110 may schedule/reschedule monitors in the timeslot as well as all other higher numbered timeslots assigned to the mobile communication device 100 as timeslots for uplink transmissions. With USF granularity, the control unit 110 may schedule and/or reschedule monitors in the TX timeslots for one radio block or four radio blocks, depending on the granularity of the radio blocks.

If, at operation 415, the header on Sub1 192 is not decoded after receiving less than all of the bursts (415-N), the control unit 110 may cause the mobile communication device 100 to receive and decode the remaining bursts (445). If the decoded TFI does not match the TFI for the mobile communication 100 (450-N), the packet was not meant for the mobile communication device 100. Since no unutilized timeslots remain for scheduling monitors, the method 400 may end.

If the decoded TFI matches the TFI for the mobile communication device 100 (450-Y), the control unit 110 may determine if a USF is detected in the decoded header in a timeslot assigned to the mobile communication device 100 (455). If the USF is detected (455-Y), the mobile communication device 100 is permitted to transmit in the assigned timeslot based on a dynamic allocation scheme. Therefore, the control unit 110 may not use those assigned transmit timeslots to reschedule monitors and the process may end.

If the USF is not detected (455-N), Sub1 192 is not permitted to perform uplink TX in specified timeslots of subsequent blocks. The control unit 110 may use the unutilized TX timeslots to schedule/reschedule monitors on Sub1 192 based on the dynamic allocation scheme (460). If EDA is used, the control unit 110 may schedule and/or reschedule monitors in the timeslot as well as all other higher numbered timeslots assigned to the mobile communication device 100 as timeslots for uplink transmissions. With USF granularity, the control unit 110 may schedule and/or reschedule monitors in the TX timeslots for one radio block or four radio blocks, depending on the granularity of the radio blocks.

One of ordinary skill in the art will appreciate that the mobile communication device may include only one communication unit (e.g., the first communication unit 120) and that the first communication unit 120 and the second communication unit 125 may be one communication unit without departing from the scope of the present inventive concept. Further, one of ordinary skill in the art will appreciate that that Sub1 192 and Sub2 197 may be associated with the one communication unit without departing from the scope of the present inventive concept.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for scheduling monitor activity for a mobile communication device, the method comprising:
   receiving less than all of a plurality of bursts for a first subscription;
   decoding a packet header by decoding the received bursts;
   determining if a decoded temporary flow identity (TFI) matches a TFI for the mobile communication device; and
   in response to a mismatch between the decoded TFI and the TFI for the mobile communication device:
      inhibiting reception of a remaining plurality of bursts; and
      scheduling the monitor activity in timeslots reserved for the remaining plurality of bursts for the first subscription that do not conflict with transmissions on a second subscription.

2. The method of claim 1, further comprising:
   in response to a match between the decoded TFI and the TFI for the mobile communication device, determining if an uplink state flag (USF) in a timeslot assigned to the mobile communication device is detected; and
   in response to a failure to detect the USF, scheduling the monitor activity for the first subscription in timeslots reserved for the remaining plurality of bursts and in unutilized transmission timeslots that do not conflict with transmissions on the second subscription resulting from failure to detect the USF.

3. The method of claim 2, wherein the unutilized transmission timeslots resulting from failure to detect the USF are the timeslots assigned to the mobile communication device for uplink transmissions on the first subscription.

4. The method of claim 2, wherein the unutilized transmission timeslots resulting from failure to detect the USF are in one radio block.

5. The method of claim 2, wherein the unutilized transmission timeslots resulting from failure to detect the USF are in four radio blocks.

6. The method of claim 2, wherein the first subscription and the second subscription are associated with one communication unit.

7. The method of claim 2, wherein the first subscription is associated with a first communication unit, and
the second subscription is associated with a second communication unit.

8. The method of claim 1, further comprising:
in response to a failure to decode the packet header by decoding less than all of the plurality of bursts:
receiving and decoding remaining bursts;
determining if an uplink state flag (USF) in a timeslot assigned to the mobile communication device is detected; and
in response to a failure to detect the USF, scheduling the monitor activity for the first subscription in unutilized transmission timeslots resulting from failure to detect the USF that do not conflict with transmissions on the second subscription.

9. The method of claim 8, wherein the unutilized transmission timeslots resulting from failure to detect the USF are the timeslot assigned to the mobile communication device for uplink transmissions on the first subscription.

10. The method of claim 8, wherein the unutilized transmission timeslots resulting from failure to detect the USF are in one radio block.

11. The method of claim 8, wherein the unutilized transmission timeslots resulting from failure to detect the USF are in four radio blocks.

12. The method of claim 1, further comprising:
in response to an inability to schedule the monitor activity in timeslots that do not conflict with transmissions on the second subscription:
determining a priority of a communication activity on the first subscription and a priority of a communication activity on the second subscription; and
scheduling the monitor activity on the first subscription in timeslots when the communication activity on the first subscription takes priority over the communication activity on the second subscription.

13. A mobile communication device, comprising:
a first communication unit;
a second communication unit; and
a control unit configured to:
cause the first communication unit to receive less than all of a plurality of bursts on a first subscription;
decode a packet header by decoding the received bursts;
determine if a decoded temporary flow identity (TFI) matches a TFI for the mobile communication device; and
in response to a mismatch between the decoded TFI and the TFI for the mobile communication device the control unit is configured to:
inhibit reception of a remaining plurality of bursts on the first subscription by the first communication unit; and
schedule monitor activity for the first subscription on the first communication unit in timeslots reserved for the remaining plurality of bursts that do not conflict with transmissions on a second subscription by the second communication unit.

14. The mobile communication device of claim 13, wherein the first communication unit and the second communication unit comprise a same communication unit.

15. The mobile communication device of claim 13, wherein:
in response to a match between the decoded TFI and the TFI for the mobile communication device, the control unit is configured to determine if an uplink state flag (USF) in a timeslot assigned to the mobile communication device is detected; and
in response to a failure to detect the USF, the control unit is configured to schedule the monitor activity for the first subscription on the first communication unit in timeslots reserved for the remaining plurality of bursts that do not conflict with transmissions on the second subscription by the second communication unit and in unutilized transmission timeslots resulting from failure to detect the USF that do not conflict with transmissions on the second subscription by the second communication unit.

16. The mobile communication device of claim 15, wherein the first communication unit in the second communication unit comprise a same communication unit.

17. The mobile communication device of claim 15, wherein the unutilized transmission timeslots resulting from failure to detect the USF are the timeslot assigned to the mobile communication device for uplink transmissions by the first communication unit.

18. The mobile communication device of claim 15, wherein the unutilized transmission timeslots resulting from failure to detect the USF are in one radio block.

19. The mobile communication device of claim 15, wherein the unutilized transmission timeslots resulting from failure to detect the USF are in four radio blocks.

20. The mobile communication device of claim 13, wherein:
in response to a failure to decode the packet header by decoding less than all of the plurality of bursts the control unit is configured to:
receive and decode remaining bursts;
determine if an uplink state flag (USF) in a timeslot assigned to the mobile communication device is detected; and
in response to a failure to detect the USF, schedule the monitor activity in unutilized transmission timeslots resulting from failure to detect the USF.

21. The mobile communication device of claim 20, wherein the unutilized transmission timeslots resulting from failure to detect the USF are the timeslot assigned to the mobile communication device for uplink transmissions.

22. The mobile communication device of claim 20, wherein the unutilized transmission timeslots resulting from failure to detect the USF are in one radio block.

23. The mobile communication device of claim 20, wherein the unutilized transmission timeslots resulting from failure to detect the USF are in four radio blocks.

24. The mobile communication device of claim 13, wherein
in response to an inability to schedule the monitor activity for the first subscription on the first communication unit in timeslots that do not conflict with transmissions on the second communication unit, the control unit is configured to:
determine a priority of a communication activity by the first subscription on the first communication unit and a priority of a communication activity by the second subscription on the second communication unit; and
schedule the monitor activity for the first subscription on the first communication unit in timeslots when the communication activity by the first subscription on the first communication unit takes priority over the communication activity by the second subscription on the second communication unit.

25. The mobile communication device of claim 24, wherein the first communication unit and the second communication unit comprise one communication unit.

26. A mobile communication device, comprising:
  means for receiving less than all of a plurality of bursts for a first subscription;
  means for decoding a packet header by decoding the received bursts;
  means for determining if a decoded temporary flow identity (TFI) matches a TFI for the mobile communication device; and
  in response to a mismatch between the decoded TFI and the TFI for the mobile communication device:
    means for inhibiting reception of a remaining plurality of bursts; and
    means for scheduling the monitor activity in timeslots reserved for the remaining plurality of bursts for the first subscription that do not conflict with transmissions on a second subscription.

27. A non-transitory computer readable medium having stored thereon instructions for causing one or more processors to perform operations comprising:
  receiving less than all of a plurality of bursts for a first subscription;
  decoding a packet header by decoding the received bursts;
  determining if a decoded temporary flow identity (TFI) matches a TFI for the mobile communication device; and
  in response to a mismatch between the decoded TFI and the TFI for the mobile communication device:
    inhibiting reception of a remaining plurality of bursts; and
    scheduling the monitor activity in timeslots reserved for the remaining plurality of bursts for the first subscription that do not conflict with transmissions on a second subscription.

* * * * *